(12) United States Patent
Whitney

(10) Patent No.: US 6,932,027 B1
(45) Date of Patent: Aug. 23, 2005

(54) PET TETHERING APPARATUS

(76) Inventor: Charles Whitney, 217 Colony Way W., Jupiter, FL (US) 33458-7725

( * ) Notice: Subject to any disclaimer, the term of this patent is extended or adjusted under 35 U.S.C. 154(b) by 1 day.

(21) Appl. No.: 10/825,730

(22) Filed: Apr. 16, 2004

(51) Int. Cl.[7] ............................................. A62B 35/00
(52) U.S. Cl. .................................................. 119/770
(58) Field of Search ...................... 119/770, 771, 772, 119/769, 797, 792, 850, 856, 863, 859, 907, 119/857; 244/151 R; 182/3, 6, 7; 224/256, 224/250; 54/71

(56) References Cited

U.S. PATENT DOCUMENTS

| | | | | |
|---|---|---|---|---|
| 1,636,459 A | * | 7/1927 | Chappel ......................... | 182/3 |
| 2,130,724 A | * | 9/1938 | Lewis ............................. | 182/3 |
| 2,661,888 A | * | 12/1953 | Sidlinger ....................... | 182/3 |
| 3,487,474 A | * | 1/1970 | De Meo ........................ | 2/311 |
| 4,103,758 A | * | 8/1978 | Himmelrich ................... | 182/3 |
| 4,378,921 A | * | 4/1983 | Allen et al. ............. | 244/151 R |
| 4,667,624 A | | 5/1987 | Smith | |
| 4,932,362 A | | 6/1990 | Birchmire, III et al. | |
| 4,991,689 A | * | 2/1991 | Cole ............................. | 182/3 |
| 5,038,719 A | | 8/1991 | McDonough | |
| 5,074,795 A | * | 12/1991 | Clark ........................... | 434/253 |
| 5,080,045 A | | 1/1992 | Reese et al. | |
| 5,161,486 A | | 11/1992 | Brown | |
| 5,325,818 A | * | 7/1994 | Leach ........................... | 119/770 |
| D350,628 S | | 9/1994 | Williams | |
| 5,615,750 A | * | 4/1997 | Phillips ......................... | 182/6 |
| 5,718,189 A | | 2/1998 | Blake | |
| 5,842,444 A | * | 12/1998 | Perrulli ........................ | 119/770 |
| 5,988,315 A | * | 11/1999 | Crane ............................ | 182/3 |
| 6,050,364 A | * | 4/2000 | Popall et al. .................. | 182/6 |
| 6,152,338 A | * | 11/2000 | Smith ........................... | 224/149 |
| 6,192,835 B1 | | 2/2001 | Calhoun et al. | |
| 6,273,029 B1 | | 8/2001 | Gish | |
| 6,439,168 B1 | | 8/2002 | Maglich et al. | |
| 6,450,129 B1 | | 9/2002 | Flynn | |
| 6,732,834 B2 | * | 5/2004 | Colorado ....................... | 182/6 |
| 2003/0052144 A1 | * | 3/2003 | Vardi ........................... | 224/258 |

* cited by examiner

*Primary Examiner*—Michael J. Carone
*Assistant Examiner*—Jordan Lofdahl
(74) *Attorney, Agent, or Firm*—McHale & Slavin P.A.

(57) ABSTRACT

The instant invention is a two piece waist mounted harness for use in hands free exercising of pets. The two pieced waist harness includes a back portion which is enlarged and padded and can be placed about a persons waist with a front portion which allows for ease of securement by the use of hook and loop attachment. A nylon strap engages the entire circumference of the first and second portion of the waist harness to prevent disengagement of the harness during use. The waist harness includes multiple attachment loops to allow for caring of addition items including attachment of multiple pets. A pouch is formed integral to the waist harness for carrying of small items such as pet treats. In addition, a flexible strap is provided for carrying of bottled water. The front portion of the waist harness is securable to a quick release snap mechanism that allows for engagement of multiple tethered pets and for quick disengagement as necessary.

15 Claims, 2 Drawing Sheets

PET TETHERING APPARATUS

FIELD OF THE INVENTION

The present invention relates to pet exercising devices and more specifically to an improved waist mountable tethering device that allows for the hand free exercising of multiple pets.

BACKGROUND OF THE INVENTION

The use of a leash, harness, or the like tethering device for the walking of a pet is well known. Typically such a device consists of a flexible line, or leash, having a proximal end which is held by an individual exercising the pet and a distal end that is coupled to the pet's collar. In the most basic form, the proximal end of the leash has a loop formed therein which operates as a handle to be held by the individual. Unfortunately, should the pet make any sudden movement the individual may not be grasping the handle formed on the leash well enough to control the pet from breaking free. This situation becomes problematic when the individual exercising a pet is near a distracting area, such as roads, where most pets are aware of the dangers associated with the moving objects. Further complicating the situation, should the individual be unfamiliar with the pet, such as when a guest is walking the family dog, if that individual is not accustomed to the particularities of the pet then any unexpected movement may cause loss of the leash. For example, dogs are known to either run toward or run away from other animals. Similarly, some pets may run away from the sound of a car horn while other pets run toward the sound.

The above situations are further complicated when an individual is running with a pet, or is exercising multiple pets. The natural rhythm of a runner requires movement of both hands and the runner's concentration may not be focused on the holding of a leash. Multiple pets require special attentiveness for each pet has its own peculiarities.

A pet walker typically carries other items, such as a water bottle or treats, making it more difficult to control the pets. Professional dog walkers are most attuned to this situation as they are paid for their services and must walk upwards of ten dogs simultaneously to be cost effective. For this reason, a number of waist and shoulder type leash patents have been directed to this situation.

U.S. Pat. No. 5,080,045 discloses a pet leash that allows for hands free control. The device includes a belt that is adapted to encircle an individual's waist, a suspension ring flexibly securing the ring to the belt and a leash that can slide circumferentially with respect to the ring. This device allows movement of a pet around the waist of a jogger, but would cause stability problems to an individual that is walking multiple dogs which may pull from different directions.

U.S. Pat. No. 5,161,486 discloses another pet leash that allows for hands free control of a pet. This device employs a waistband with two attachment loops, and a quick release lead clasp allowing slidable movement of the leash. This device also allows for a single pet but results in problems control problems if multiple pets are harnessed.

U.S. Pat. Nos. 5,038,719; 6,450,129; and D350,628 disclose pet leashes that hook to a waist belt. These devices includes a coupler that allows the leash to be shortened, or pressure removed from the waist by the use of a hand holdable loop. This device will not work with multiple pets.

U.S. Pat. No. 6,439,168 discloses a hand held leash that harnesses two pets together, such a device cannot be used for multiple pets.

U.S. Pat. No. 6,273,029 discloses a hand held leash that includes a rotatable ring to prevent entanglement of multiple pets. U.S. Pat. Nos. 4,667,624, 4,932,362, 5,038,719, 5,842, 444; 5,718,189, and 6,192,835 set forth additional waist and shoulder type leash patents.

Despite the prior art, there is a need for a tethering system that provides superior comfort to the wearer and control of the leashed pets by use of a two piece adjustable waist belt with pressure distribution and a means for quick pet leash disengagement. The result is a device that allows hands free control of pets that accompany an individual for either companionship, motivation, exercise and/or for safety.

SUMMARY OF THE INVENTION

The instant invention is a waist mounted harness that allows hands free control of multiple leashed pets. The waist harness if constructed from two padded sections that are coupled together to encircle an individuals waist, a nylon support strap couples the sectioned together by the use of buckles. The two sections can be made of various sizes to accommodate an individual's waist. The belt includes mulitple attachment rings, preferably constructed from nylon loops, for securement of additional harnesses. This quick release can be moved to accommodate various attachment areas with the various nylon loops, as well as miscellaneous items such as waste disposal bags. A bottle holder accommodates a water bottle for the pets and a side bag provides for placement of animal treats, car phone, keys, and so forth. A quick release latch is provided on the front of the waist belt allowing for the engagement/disengagement of attached leashes.

In the preferred embodiment, each leash has elasticity to lessen the burden on the wearer. Larger dogs have a tendency to run quickly and the use of the dynamic rope leash provides way to absorb shock. At the end of each leash is a quick release coupling that is spring loaded for securement to the collar of the pet.

Thus, an objective of the instant invention is to provide an improved hands free pet lease based upon a two piece waist harness having a contour conforming shape that consists of a soft padded material and a supporting outer strap capable of distributing the pressure applied by multiple pets.

Another objective of the invention is to provide a two piece waist harness, a first section for placement around the back of an individual and a second section for placement in the front of an individual, the front piece is removable and changeable.

Another objective of the instant invention is to employ a nylon strap for reinforcing of waist harness and to distribute pressure applied to the leash connection.

Still another objective of the instant invention is to provide quick release clamps for pet leash attachments.

Still another objective of the instant invention is to employ dynamic rope leashes.

Yet another objective of the instant invention is to provide a waist harness wherein leashes and quick release snaps can be attached at various places around the perimeter of the harness.

Still another objective of the invention is to provide a waist mounted pouch for pet treats, cellular phones, car keys, and so forth.

Yet still another objective of the invention is to provide a secured waist mounted water bottle holder.

Still another objective of the invention is to provide a light reflective material which is sewn onto the back side of the harness providing enhanced nighttime visiblity.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
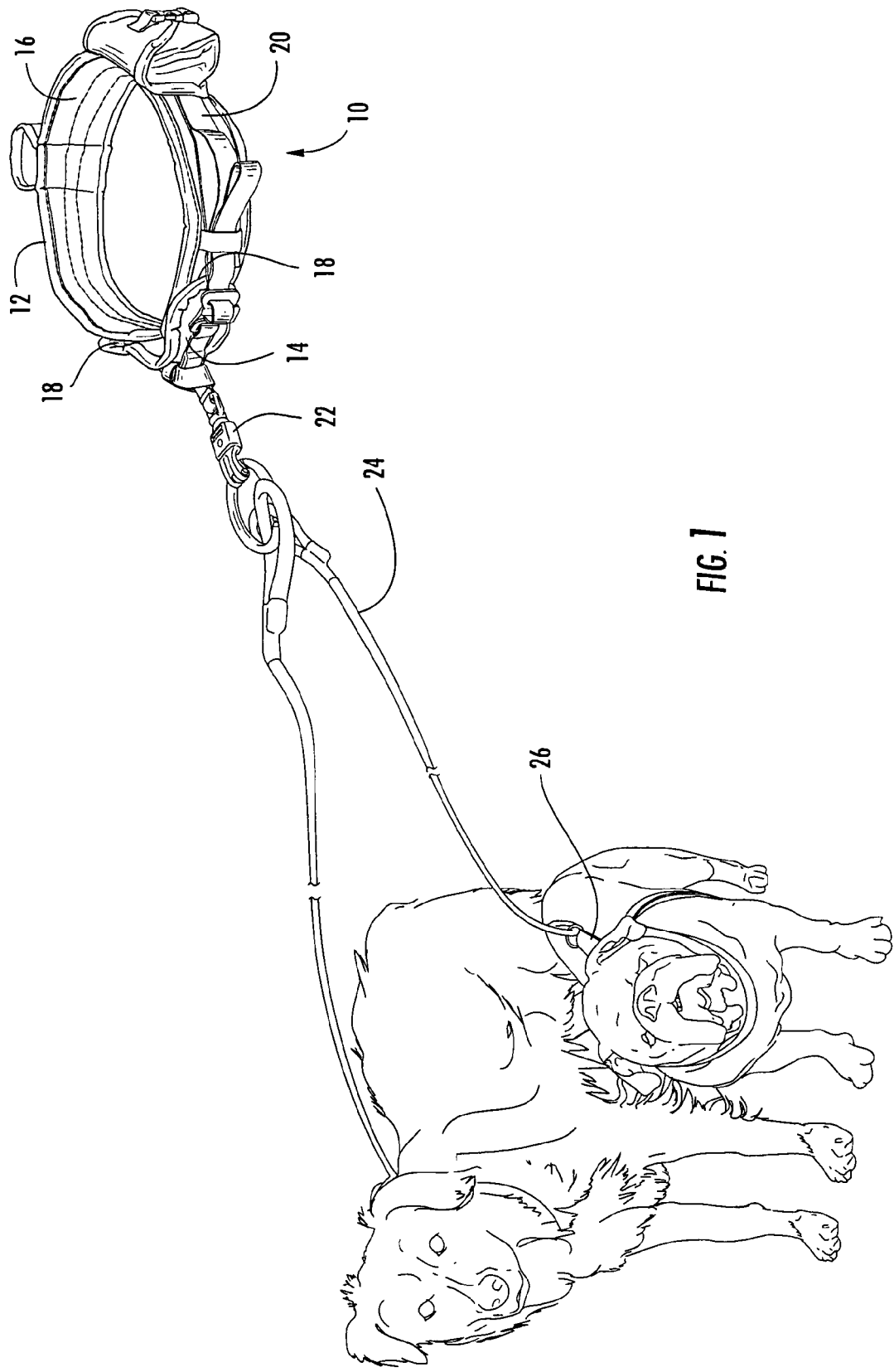
FIG. 1 is a pictorial view of the instant invention tethering two dogs.

Now referring to FIG. 1 set forth is pictorial view of the instant invention setting forth a waist harness 10 consisting of a back portion 12 and a front portion 14. The waist harness includes a padded section 16 to comfortably conform to an individual's body. The front portion 14 secured to the back portion 12 by use of a hook and loop attachment 18 and 24 and secondary securement by a nylon strap 20. A rotatable quick release snap 22 is coupled to the front panel 14 and at least one leash 24 is securable from the snap 22 to a pet collar 26.

Figure 2:
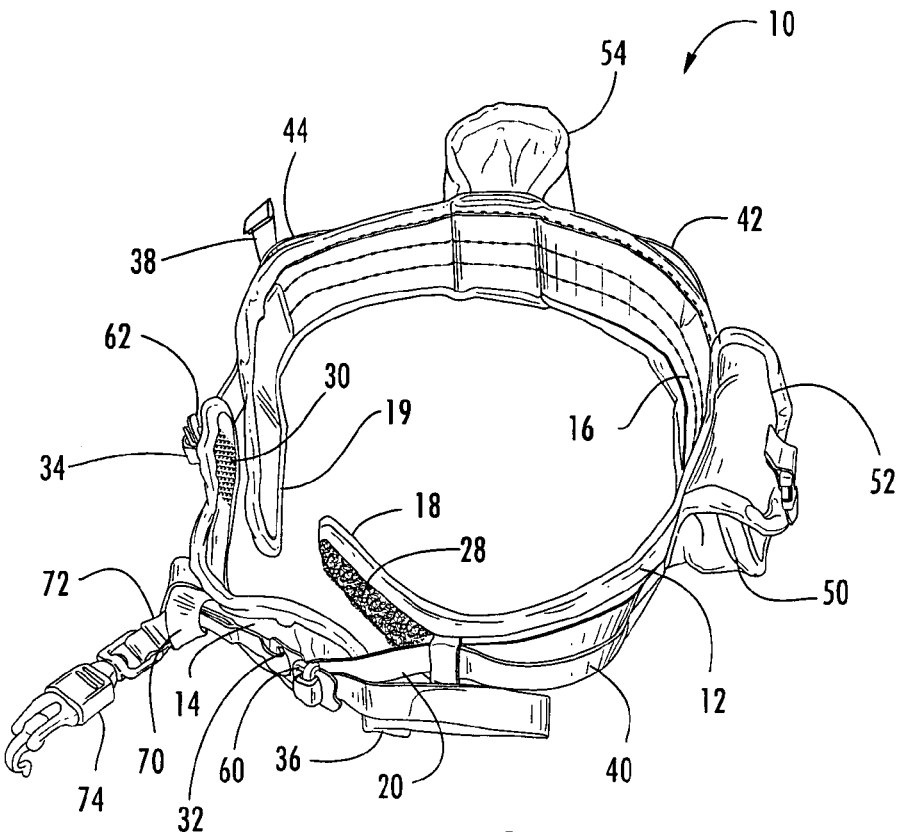
FIG. 2 is a top view of the back and front portion that forms the waist harness.
Figure 3:
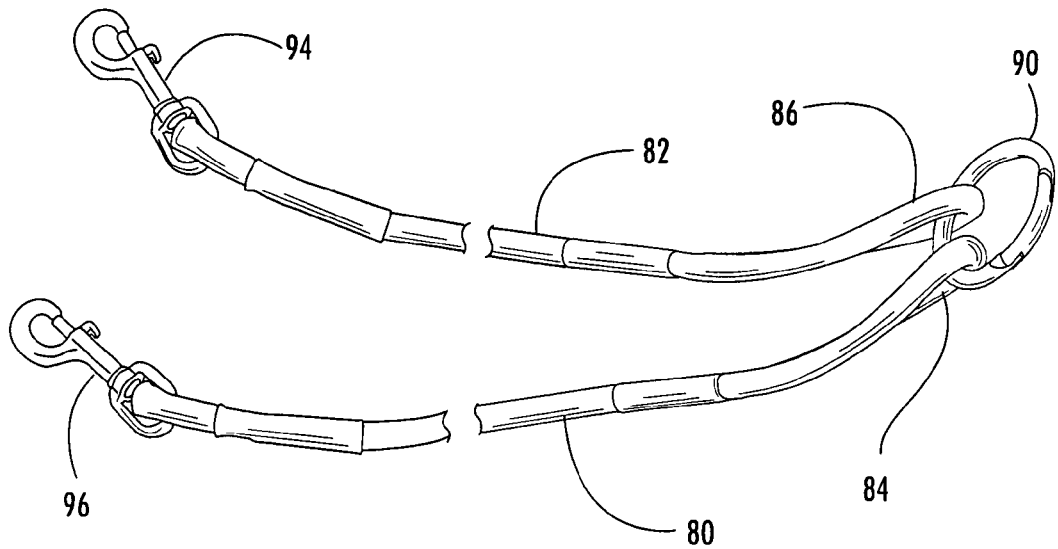
FIG. 3 is the leashes for attachment from the waist harness to the pet collars.

Now referring to FIG. 2 shown is the waist harness 10 in greater detail having back portion 12 just formed from an elongated padded strap having the first engagement end 18 and a second engagement end 19 with the padded center section 16 formed there between. In the preferred embodiment the padded center section is approximately 25 inches long and 4 inches high. The first and second engagement ends 18 and 19 are preferably 2 inches high and include hook and loop attachment 28 and 30 from engagement to reciprocal hook and loop attachment points 32 and 34 located on the front section 14. Nylon strap 20 is sewn onto the outer surface of the back portion 12 having a first end 36 extending beyond the first engagement end 18 of the back and a second end 38 which extends beyond the second engagement end 19 of the back portion. The strap 20 includes a first attachment loop 40 which is created by attachment of the nylon strap in such a manner so as to cause formation of the loop by sewing the ends of the strap to the back portion with spacial attachment. Further attachment loops 40, 42, and 44 are included from alternative nylon webbing wherein a plastic sleeve can be placed over each loop to provide longevity to the nylon strap by operating as a protective sheathing. Further included on the back portion is a nylon pouch 50 which is secured to another surface of the back section and has a releasable securable flap 52 to allow items to be placed within the pouch without fear of loss. For instance, pet treats may be placed within the pouch or any other small items that may be necessary for care taking of the pets. A flexible strap 54 is further secured to an outer surface of the back section and allows for placement of a water bottle within the strap again to allow the persons hands remain free while tethering of the pets. The front panel 14 includes a first and second buckle 60 and 62 for use in engagement the first and second free ends of the strap 36 and 38. In operation the back portion is placed around the waist of an individual which encompasses approximately three quarters of the waist of an average sized person. The front portion 14 is then secured to the back portion by the use of the hook and loop attachment points. Strap 38 is placed through buckle 62 wherein the nylon strap 20 operates to withstand most of the stress placed upon the tethering device. Similarly, strap end 36 is placed through buckle 60 so as to provide a padded circumference to the individuals waist which is lightly attached and held in place by the hook and loop attachment and further is secured by the nylon strap. It should be noted that once a back portion and front portion has been sized to an individual, one strap end such as 38 may remain engaged to buckle 62 wherein release of the harness would only require detachment of one free end of the strap 36 from buckle 60 and detachment of the appropriate hook and loop section. On the front portion 14, attachment 70 allows for securement of nylon strap 72 in a perpendicular fashion to permit coupling to swivel snap 74. The swivel snap allows for rotation of the snap and is preferably made out of metal but could also be made from plastic. The swivel snap allows for engagement of leashes 80 and 82 preferably by attachment rings 84 and 86. The attachment rings allow multiple leashes to be placed on the snap 74 and can be further coupled by use of a coupling ring 90 wherein numerous pets could be placed on a single snap 74. In the preferred embodiment the leashes 80 and 82 are formed from a dynamic circular rope which allows further absorption of shock when larger pets move quickly. The end of each leash 94 and 96 are conventional snaps for attachment to the pet collar.

The waist harness permits a quick release snap to be positioned on either the left or right side of the waist harness, or on both sides. In this manner, the harness is configured to accommodate a dog running directly along the side of the individual, wherein the tether does not interfere with the leg movement of the individual. To lessen the length of a tether leash, the carabineer is attached to the dog leash and to the snap hook to form a leash ½ the size. The leash itself is hooked through the quick release snap and the dog is hooked to the other end by normal snap hook, ensuring the dog stays directly at the side of the running individual.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What is claimed is:

1. A pet tethering device comprising:
  a waist harness consisting of a back section and a front section, said back section formed from an elongated padded strap having a first engagement end and a second engagement end with an enlarged padded support section therebetween; a nylon strap with a width of about one inch is secured to an outer surface of said waist harness having a first end extending beyond said first engagement end and a second end extending beyond said second engagement end, said nylon strap configured to provide at least one attachment loop to said back portion;
  said front section formed from a rectangular shaped padded strap having a first receptive end releasably securable to said first engagement end of said back section and a second receptive end releasably securable to said second engagement end of said back section, said front section including an attachment loop formed a nylon strap with a width of about one inch between said first and second end; said first receptive end including a first buckle for engaging said first end of said nylon strap, said second receptive end including a second buckle for engaging said second end of said nylon strap;

a rotatable quick release snap secured to said front section attachment loop; and a least one leash securable from said snap to a pet collar;

wherein said waist harness can be comfortably secured to an individual having different waist dimensions whereby said quick release snap and said back portion attachment loop provide leash attachment points to the nylon strap, said leash securable to a pet to allow hands free exercising of the pet.

2. The pet tethering device according to claim 1 wherein said enlarged padded support section has a first width and said first and second engagement end has a second width, said first width greater than said second width.

3. The pet tethering device according to claim 1 wherein at least a portion of said nylon strap extends from said back support providing multiple attachment loops for securing pet harnesses thereto.

4. The pet tethering device according to claim 1 including a nylon pouch secured to an outer surface of said back section of said waist harness, said pouch having a releasably securable flap for holding items within said pouch.

5. The pet tethering device according to claim 1 including a flexible strap secured to an outer surface of said back section of said waist harness, said flexible strap available for releasably securing a water bottle to said harness.

6. The pet tethering device according to claim 1 wherein said first receptive end and said first engagement end employ hook and loop attachment means for primary attachment.

7. The pet tethering device according to claim 1 wherein said second receptive end and said second engagement end employ hook and loop attachment means for primary attachment.

8. The pet tethering device according to claim 1 wherein said waist belt includes a reflective surface for nighttime visibility.

9. The pet tethering device according to claim 1 wherein said leash is formed from a dynamic circular rope.

10. A pet tethering device comprising:

a waist harness consisting of a back section and a front section, said back section formed from an elongated padded strap having a first engagement end and a second engagement end with an enlarged padded support section therebetween, said enlarged padded support section has a first width and said first and second engagement end has a second width, said first width greater than said second width; a nylon strap with a width of about one inch is secured to an outer surface of said waist harness having a first end extending beyond said first engagement end and a second end extending beyond said second engagement end, said nylon strap configured to provide three attachment loops to said back portion;

said front section formed from a rectangular shaped padded strap having a first receptive end releasably securable to said first engagement end of said back section and a second receptive end releasably securable to said second engagement end of said back section, said front section including an attachment loop formed a nylon strap with a width of about one inch between said first and second end; said first receptive end including a first buckle for engaging said first end of said nylon strap, said second receptive end including a second buckle for engaging said second end of said nylon strap;

a rotatable quick release snap secured to said front section attachment loop; and a least one leash securable from said snap to a pet collar, said leash including a dynamic circular rope allowing said leash to stretch;

wherein said waist harness can be comfortably secured to an individual having different waist dimensions whereby said quick release snap and said back portion attachment loop provide leash attachment points to the nylon strap, said leash securable to a pet to allow hands free exercising of the pet.

11. The pet tethering device according to claim 10 including a nylon pouch secured to an outer surface of said back section of said waist harness, said pouch having a releasably securable flap for holding items within said pouch.

12. The pet tethering device according to claim 10 including a flexible strap secured to an outer surface of said back section of said waist harness, said strap available for releasably securing a water bottle to said harness.

13. The pet tethering device according to claim 10 wherein said first receptive end and said first engagement end employ hook and loop attachment means for primary attachment.

14. The pet tethering device according to claim 10 wherein said second receptive end and said second engagement end employ hook and loop attachment means for primary attachment.

15. The pet tethering device according to claim 10 wherein said waist belt includes a reflective surface for nighttime visibility.

* * * * *